United States Patent [19]

Pask

[11] 4,318,666

[45] Mar. 9, 1982

[54] COOLED SHROUD FOR A GAS TURBINE ENGINE

[75] Inventor: George Pask, Stanton-by-Bridge, England

[73] Assignee: Rolls-Royce Limited, London, England

[21] Appl. No.: 160,903

[22] Filed: Jun. 17, 1980

[30] Foreign Application Priority Data

Jul. 12, 1979 [GB] United Kingdom ............... 24365/79

[51] Int. Cl.³ ................................................ F02C 7/12

[52] U.S. Cl. .................................... 415/116; 415/200; 415/214

[58] Field of Search ............... 415/115, 116, 200, 214, 415/174, 178, 117, 172 A; 60/39.16 R

[56] References Cited

U.S. PATENT DOCUMENTS

| | | | |
|---|---|---|---|
| 2,930,521 | 3/1960 | Koehring | 415/200 |
| 3,423,070 | 1/1969 | Corrigan | 415/200 |
| 3,728,039 | 4/1973 | Plemmons et al. | 415/174 |
| 3,825,364 | 7/1974 | Halila et al. | 415/174 |
| 4,199,300 | 4/1980 | Tubbs | 415/174 |

*Primary Examiner*—Louis J. Casaregola

*Attorney, Agent, or Firm*—Cushman, Darby & Cushman

[57] ABSTRACT

A cooled shroud for a gas turbine engine comprises an annular metallic supporting member having holes therethrough for the flow of cooling air and a layered coating on its inner face. The layered coating comprises a first layer of porous material through which the cooling air may permeate, and a second layer of impermeable ceramic covering all but selected areas of the surface of the first layer. In this way the cooling air is largely constrained to flow along the porous material to provide good cooling with relatively low air flow.

5 Claims, 2 Drawing Figures

COOLED SHROUD FOR A GAS TURBINE ENGINE

This invention relates to a cooled shroud for a gas turbine engine.

As the highest temperature in gas turbine engines has increased over the years it has become more desirable to provide cooling for the shroud structure which forms the outer boundary of the gas flow of the engine particularly in the hottest areas such as the turbine. At the same time the problems of differential expansion between these shroud members and the rotor blade tips have led to a requirement for efficient cooling of the shroud structure, and therefore control of its expansion.

The present invention provides a way in which the inner surface of the shroud may be formed so as to enable efficient cooling of the shroud itself.

According to the present invention a cooled shroud for a gas turbine engine comprises an annular metallic supporting skin having an inner and an outer face and apertures therethrough for the flow of cooling fluid to its inner face, a layer of porous material secured to said inner face and through which the cooling fluid may permeate, and an impermeable layer of ceramic overlying part of said porous layer so as to prevent said cooling fluid flowing from said porous layer except in predetermined areas.

In one embodiment said predetermined area comprises the rear portion of the inner face of the annular shroud.

The invention is particularly suitable for shrouds made in the form of annular box section members.

Figure 1:
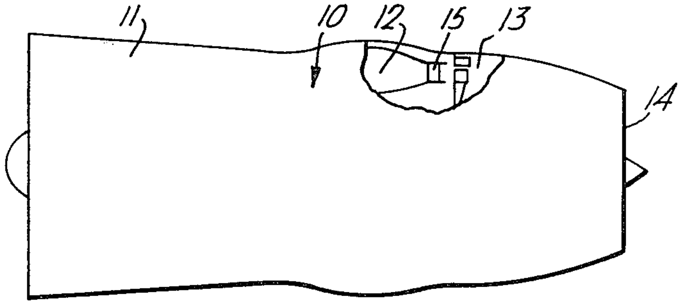
Figure 2:
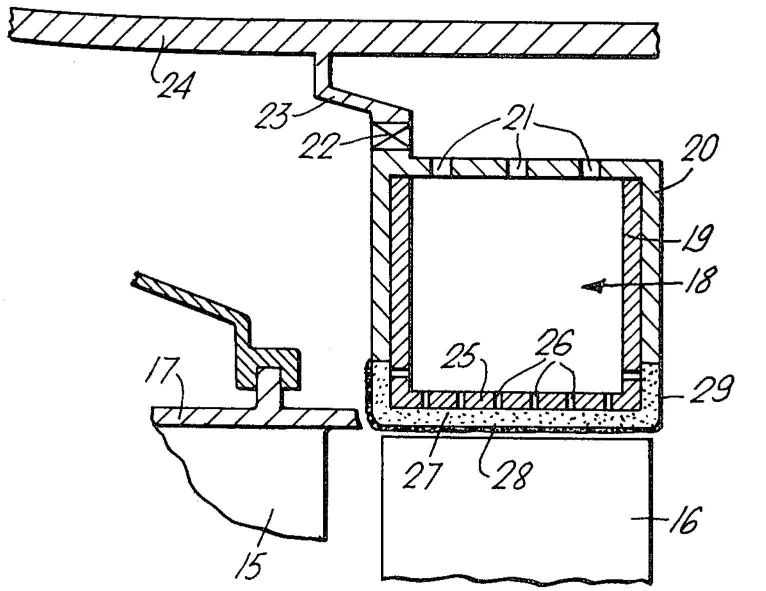

The invention will now be particularly described merely by way of example with reference to the accompanying drawings in which:

FIG. 1 is a partly broken away view of a gas turbine engine having a cooled shroud in accordance with the invention and, FIG. 2 is an enlarged section through the cooled shroud of FIG. 1.

In FIG. 1 there is shown a gas turbine engine 10 having a compressor section 11, a combustion chamber 12, a turbine section 13 and a final nozzle 14. Overall operation of the engine is quite conventional and is not further elaborated herein.

As will be understood by those skilled in the art in the turbine region of the engine gases from the combustion chamber 12 pass through a set of nozzle guide vanes 15 to be directed upon turbine rotor blades 16. The outer platforms 17 of the vane 15 define the outer boundary of the hot gas flow through the vanes but it is necessary that additional shroud means be provided to define the outer boundary of the gas flow passage through the rotor blades 16. In some instances the rotor blades 16 have their own integral shroud which perform the function of defining the boundary but in the present case the blades 16 are unshrouded.

To define the outer boundary a shroud ring generally indicated at 18 is provided. The ring 18 comprises a box section member made up of two co-operating U section annular members 19 and 20. The member 20 is provided with apertures 21 in its outer surface to enable cooling air to enter the hollow interior of the ring 18 and the rings 19 and 20 are cross dogged at 22 to a flange 23 extending from a casing 24 of the engine.

In order to allow the inner surface of the ring 18 to be cooled this surface is made up from a series of different layers. The inner skin 25 of the U section member 19 is provided with a plurality of apertures 26 through which cooling fluid, in this case air, may flow. The skin 25 also serves to support a layer 27 of a porous material which in the present instance comprises a compacted and sintered material formed from a plurality of small spheres of a nickel based superalloy material. The size of spheres and the degree of compaction is pre-determined to provide the required amount of porosity for the layer 27. The cooling fluid which passes through the holes 26 is therefore allowed to permeate the layer of porous material 27.

Over the majority of the outer surface of the layer 27 a further coating 28 of impermeable ceramic is provided. This layer which may for instance comprise yttria stabilised zirconia or magnesium zirconate may be applied by plasma spraying or other known method and it is arranged to cover all of the upstream portion of the inner face of the layer 27 leaving only the rearwardly facing section of surface 29 unblocked. The cooling air having once permeated the material 27 is therefore forced to flow rearwardly through this layer until it reaches the unblocked portion of surface 29. It is there allowed to exit and to rejoin the main gas stream of the engine.

It will be seen therefore that the construction described above provides a way in which a highly heat resistant ceramic coating is used to define the actual boundary of the gas flow. It is well supported on the porous material 27 which is well cooled by the transpiration of the cooling air. This cooling air is however prevented from flowing out onto the external surface of the coating 28.

Clearly a variety of different materials could be used for the inner surface of the shroud for the porous material and for the ceramic coating and these will be apparent to one skilled in the art.

I claim:

1. A cooled shroud for a gas turbine engine comprising an annular metallic supporting member having an inner and an outer face and apertures therethrough for the flow of cooling fluid to the inner face, a layer of porous material secured to said inner face and through which the cooling fluid may permeate and an impermeable layer of ceramic overlying part of said porous layer so as to prevent said cooling fluid flowing from said porous layer except in predetermined areas.

2. A cooled shroud as claimed in claim 1 and in which the said predetermined areas comprise the rearward portion of the inner face.

3. A cooled shroud as claimed in claim 1 or claim 2 and comprising an annular box section shroud ring whose inner portion comprises said annular metallic supporting member.

4. A cooled shroud as claimed in claim 1 and in which said porous material comprises a plurality of compacted and sintered spheres of metallic material.

5. A cooled shroud as claimed in claim 1 and in which said ceramic is chosen from the group consisting of yttria stabilised zirconia and magnesium zirconate.

* * * * *